United States Patent
Kuramori et al.

(10) Patent No.: US 6,805,176 B2
(45) Date of Patent: Oct. 19, 2004

(54) TIRE/WHEEL ASSEMBLY AND RUN-FLAT SUPPORT MEMBER

(75) Inventors: Akira Kuramori, Hiratsuka (JP); Atsushi Tanno, Hiratsuka (JP); Masatoshi Kuwajima, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 10/609,596

(22) Filed: Jul. 1, 2003

(65) Prior Publication Data

US 2004/0011448 A1 Jan. 22, 2004

(30) Foreign Application Priority Data

Jul. 18, 2002 (JP) ......................................... 2002-210068

(51) Int. Cl.$^7$ ................................................ B60C 5/00
(52) U.S. Cl. ...................... 152/156; 152/520; 29/894.31
(58) Field of Search ................................ 152/156, 158, 152/247, 251, 250, 240, 155, 520, 331.1, 516, 379.8, 539, 546, 552, 553, 557; 156/110.1; 29/894.31

(56) References Cited

U.S. PATENT DOCUMENTS 3,463,976 A * 8/1969 Steinmetz, Jr. et al. ..... 257/785
6,463,974 B1 * 10/2002 Hellweg et al. ............ 152/400
6,463,976 B1 * 10/2002 Glinz et al. ................. 152/520
6,619,350 B1 * 9/2003 Dieckmann et al. ........ 152/156

FOREIGN PATENT DOCUMENTS

DE 3818648 A1 * 7/1989 ........... B60C/17/04
JP 2001-519279 A1 10/2001

* cited by examiner

Primary Examiner—Frantz F. Jules
(74) Attorney, Agent, or Firm—Rader, Fishman & Grauer PLLC

(57) ABSTRACT

A tire/wheel assembly in which a run-flat support member 3 is inserted into a cavity of a pneumatic tire 2, the run-flat support member 3 including a circular shell 4 in which the outer circumferential side thereof is used as a support surface and the inner circumferential side thereof is opened to have two leg portions, and elastic rings 5 supporting the ends of the two leg portions on a rim. The outer circumferential surface of the circular shell 4 in a cross-section cut in a tire width direction has a shape with a plurality of convex portions 4a, 4b, aligned in a tire width direction, and these convex portions have a plurality of different kinds of radius of curvatures and/or thickness.

8 Claims, 2 Drawing Sheets

TIRE/WHEEL ASSEMBLY AND RUN-FLAT SUPPORT MEMBER

BACKGROUND OF THE INVENTION

The present invention relates to a tire/wheel assembly and a run-flat support member, and more specifically to a tire/wheel assembly and a run-flat support member having superior durability during run-flat traveling.

In response to demands from the market, there have been many technologies proposed to allow a vehicle to run urgently for several hundreds of kilometers even when a pneumatic tire is punctured while the vehicle is running. Amongst these many proposals, technologies proposed in Japanese Patent Laid-Open Publication No. 10-297226 and Published Japanese Translation of a PCT Application No. 2001-519279 enable run-flat traveling by fitting a core onto a rim in the inner side of a cavity of a pneumatic tire that is assembled to the rim, and by supporting the punctured tire using the core.

The foregoing run-flat core includes a circular shell in which the outer circumferential side thereof serves as a support surface and the inner circumferential side thereof is opened so as to form two leg portions. Also, elastic rings are fitted to both leg portions of the circular shell, thus the run-flat core is supported on the rim through the elastic rings. By using respect to this run-flat core, a conventional wheel and rim can be used as they are without any particular modifications. Therefore, the run-flat core is advantageously adopted without causing confusion in the market.

However, during run-flat traveling, the above tire/wheel assembly (wheel) runs while supporting a load mainly by the circular shell. Therefore, fatigue appears in the circular shell first, and the circular shell in due course will break after driving a long distance or being repeatedly used over a number of times. If the circular shell is broken, run-flat traveling becomes no longer possible. Hence, the life span of the above tire/wheel assembly depends on durability of the circular shell. Accordingly, in order to extend a run-flat traveling, it is important to increase the durability of the circular shell to a feasible extent.

SUMMARY OF THE INVENTION

An object of the present invention is to provide a tire/wheel assembly which improves durability of a circular shell and enables a run-flat traveling distance to be further extended. Another object of the present invention is to provide a run-flat support member which improves durability of a circular shell and enables a run-flat traveling distance to be further extended.

In the tire/wheel assembly of the present invention for achieving the above object, a run-flat support member is inserted in a cavity of a pneumatic tire, where the run-flat support member includes a circular shell in which the outer circumferential side thereof is used as a support surface and the inner circumferential side thereof is opened to have two leg portions, and elastic rings for supporting the ends of the two leg portions on the rim. This tire/wheel assembly is characterized in that the outer circumferential surface of the circular shell in a cross-section cut in a tire width direction has a shape with a plurality of convex portions aligned in a tire width direction, and that the convex portions have a plurality of different kinds of radius of curvatures and/or thickness.

Moreover, the run-flat support member of the present invention includes a circular shell in which the outer circumferential side thereof is used as a support surface and the inner circumferential side thereof is opened to have two leg portions, and elastic rings for supporting the ends of the two leg portions on the rim. The run-flat support member is characterized in that the outer circumferential surface of the circular shell in a cross-section cut in a tire width direction has a shape with a plurality of convex portions aligned in a tire width direction, and that the convex portions have at least two different kinds of radius of curvatures and/or thickness.

According to the present invention, as described above, the outer circumferential surface of the circular shell in a cross-section cut in a tire width direction has the shape with the plurality of convex portions aligned in a tire width direction, and the convex portions have a plurality of different kinds of radius of curvatures and/or thickness. Consequently, a convex portion that has a smaller radius of curvature or a larger thickness compared to those of the other convex portions has higher rigidity compared to the other convex portions. Therefore, by disposing the convex portion having higher rigidity so as to come to a position where the largest load is applied in a tire width direction, durability of the circular shell is improved and a run-flat traveling distance can be extended.

In many cases, a wheel alignment has positive camber. Because of this, a load distributed in a direction of tire tread width, in particular, is applied intensively to outer sides of a vehicle body. Therefore, amongst the plurality of convex portions forming the circumferential surface of the circular shell, a convex portion disposed on an outer side of a vehicle body when fitted to the vehicle is formed to have a radius of curvature smaller than that of other convex portions. Alternatively, a convex portion disposed on an outer side of a vehicle body when fitted to the vehicle is formed to have a peak and/or sidewall on the outer side of the vehicle body, where the peak and/or sidewall have a thickness larger than that of any other convex portion. Accordingly, the rigidity of the above convex portion is increased, thus improving durability of the circular shell durability.

DESCRIPTION OF THE PREFERRED EMBODIMENTS

Figure 1:
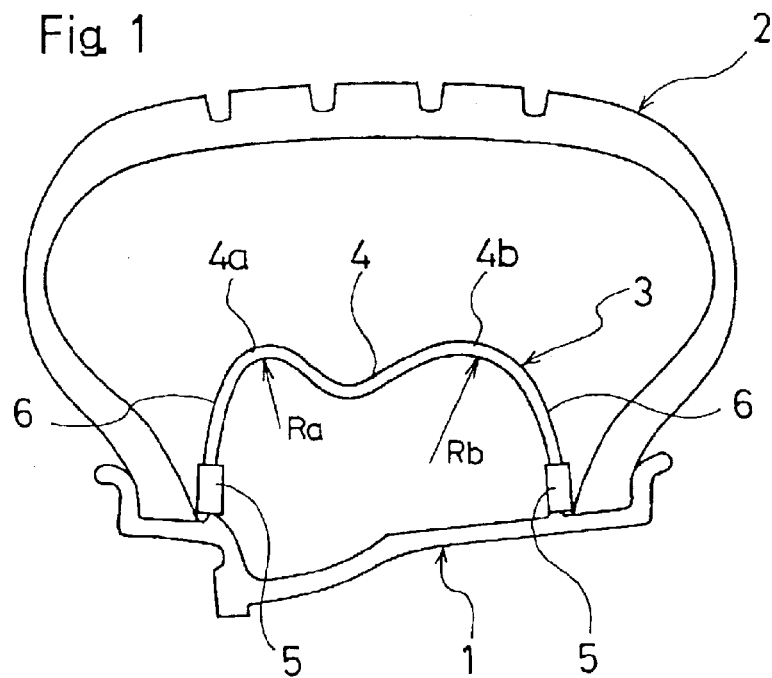
FIG. 1 is a cross-sectional view along a meridian line showing a main part of a tire/wheel assembly according to an embodiment of the present invention.

In the present invention, the run-flat support member is formed as a circular member which is inserted in a cavity of a pneumatic tire. This run-flat support member is formed to have its outer diameter smaller than the inner diameter of the cavity of the pneumatic tire in order to maintain a certain distance from the inner surface of the cavity. The inner diameter of the run-flat support member is formed to be approximately the same as the inner diameter of the beads of the pneumatic tire. Then, the run-flat support member is inserted into the inside of the pneumatic tire and assembled to a wheel together with the pneumatic tire through a rim, thus configuring the tire/wheel assembly. When the pneumatic tire is punctured while driving the vehicle with the tire/wheel assembly fitted thereto, the tire flattened out due to the puncture is supported on the outer circumferential surface of the run-flat support member, thus making run-flat traveling possible.

The above-described run-flat support member is constituted of the circular shell and elastic rings as main members thereof.

In the circular shell, a continuous support surface for supporting a punctured tire is formed in the outer circumferential side (outer diameter side), and the inner circumferential side (inner diameter side) is in an open shape having two leg portions serving as respective sidewalls on the right and left sides. The support surface on the outer circumferential side is formed to have a curved surface that is convex toward the outer diameter side, when viewed in the cross section profile that is orthogonal to a circumferential direction of the tire. The number of convex portions aligned in a tire width direction (tire axis direction) is plural, i.e., two or more.

Moreover, radius of curvatures and/or thickness of the plurality of convex portions, which form the curved surfaces of the same, are differentiated depending on where these convex portions are disposed in a tire width direction. More specifically, a convex portion, which has a smaller radius of curvature or a larger thickness than those of the other convex portions, has higher rigidity with respect to a load in a radius direction, compared to the other convex portions. When the foregoing convex portion is disposed at the position where the largest load is applied in a tire width direction, durability of the circular shell is improved, thus enabling a run-flat traveling distance to be extended.

Because a wheel alignment is set to positive camber in many cases, a load distributed in a direction of tire tread width is large on outer sides of a vehicle body. Therefore, amongst the plurality of convex portions aligned in a tire width direction, a convex portion disposed on an outer side of a vehicle body when fitted to the vehicle is formed to have a radius of curvature smaller than that of other convex portions. Alternatively, a convex portion disposed on an outer side of a vehicle body when fitted to the vehicle is formed to have a larger thickness in its peak and/or sidewall on the outer side of the vehicle body, compared to other convex portions. Accordingly, the position where the load is intensively applied has increased rigidity with respect to a load in a radial direction, thus enabling durability of the circular shell durability to be further improved. Therefore, a possible distance for run-flat traveling is further extended.

There is no particular limitation with regard to the radius of curvature dimension of the convex portion disposed on the outer side of the vehicle body when fitted to the vehicle as described above, as long as the dimension is smaller than those of the rest of the convex portions. However, it is preferable to set the radius of curvature dimension of this convex portion within a range from 0.6 to 0.9 times as large as those of the other convex portions. If the convex portion disposed on the outer side of the vehicle body has a radius of curvature smaller than 0.6 times of those of the others, the inner surface of the tire will be easily damaged. On the other hand, if it is larger than 0.9 times, the effect of the aforementioned increased rigidity will not become substantial.

In addition, when the convex portion disposed on the outer side of the vehicle body when fitted to the vehicle has a thickness larger than that of other convex portions, it is preferable that the thickness dimension thereof be 1.1 to 3.0 times as large as that of the other convex portions. If the dimension is smaller than 1.1 times of the others, the effect of increased rigidity will not be substantial. On the other hand, the dimension over 3.0 times of the others will cause an increase in weight, which is not preferable.

The elastic rings are fitted to each end of the two leg portions provided on the inner diameter side of the circular shell, and are abutted on rim seats on the right and left sides respectively, to support the circular shell. Since the elastic rings are made of rubber or elastic resin, the elastic rings do not only mitigate vibration of and impact upon the circular shell, but also are slip resistant with respect to the rim seats so that the circular shell is stably supported.

Due to the fact that the run-flat support member has to support a vehicle weight through a punctured tire, the circular shell is made of a hard material. For the constituent material of the circular shell, metal or resin, etc. is used. As for metal, for example, steel or aluminum, etc. is listed. The resin can be any of thermoplastic resin and thermosetting resin. Examples of the thermoplastic resin are nylon, polyester, polyethylene, polypropylene, polystyrene, polyphenylene sulfide and ABS. Examples of the thermosetting resin are epoxy resin and unsaturated polyester resin. The single resin can be used, or can also contain reinforcing fibers compounded therein to be used as fiber-reinforced resin.

Hereinafter, a more detailed description of the present invention will be provided based on embodiments illustrated in the drawings.

FIG. 1 is a cross-sectional view along a meridian line showing a main part of the tire/wheel assembly (wheel) according to an embodiment of the present invention.

The reference number 1 denotes a rim on the circumference of a wheel, the reference number 2 denotes a pneumatic tire, and the reference number 3 denotes a run-flat support member. The rim 1, pneumonic tire 2, and run-flat support member 3 are formed in a circular shape coaxially around the rotation axis of the wheel (not shown).

The run-flat support member 3 includes a circular shell 4 made of a hard material such as metal or resin, and elastic rings 5 made of an elastic material such as high hardness rubber or elastic resin. The circular shell 4 is formed to have two convexly curved surf aces forming convex portions 4a, 4b aligned in a tire width direction on the circumferential side of the circular shell 4. The convex portion 4a is disposed on the outer side of a vehicle (the left side in the drawing) when fitted to the vehicle, and the convex portion 4b is disposed on the inner side of the vehicle (the right side in the drawing) Radius of curvatures Ra, Rb of the two convex portions 4a, 4b, respectively, are different from each other. The radius of curvature Ra of the convex portion 4a is smaller than the radius of curvature Rb of the convex potion 4b.

The inner circumferential side of the circular shell 4 is opened to have sidewalls on its both sides, the sidewalls serving as two leg portions 6, 6, respectively. Elastic rings 5, 5 are respectively fitted to the ends of the leg portions 6, 6. The run-flat support member 3 configured of the circular shell 4 and elastic rings 5 in this way is inserted into the pneumatic tire 2, and the elastic rings 5, 5 are fitted to rim seats 1s, 1s of the rim 1 simultaneously with beads 2b, 2b.

In the circular shell 4 included in the foregoing run-flat support member 3, the convex portions 4a and 4b have different levels of rigidity from one another with respect to a load in a radial direction. The convex portion 4a with the smaller radius of curvature Ra has higher rigidity than that of the convex portion 4b with the larger radius of curvature Rb. Moreover, when the tire/wheel assembly is fitted to the vehicle, the convex portion 4a comes to the outer side of the vehicle body and the convex portion 4b comes to the inner side of the vehicle body. In a normal vehicle, a load distribution in a tire width direction is generally biased toward the outer side of the vehicle body when the tire/wheel assembly is fitted to the vehicle. Therefore, a load applied to the tire/wheel assembly from a road surface during run-flat traveling is supported by the convex portion 4a having the highest rigidity. Specifically, since the region where the load is intensively distributed is supported by the convex portion 4a having the highest rigidity, the durability of the circular shell 4 is enhanced, correspondingly extending a possible distance for run-flat traveling.

Figure 2:
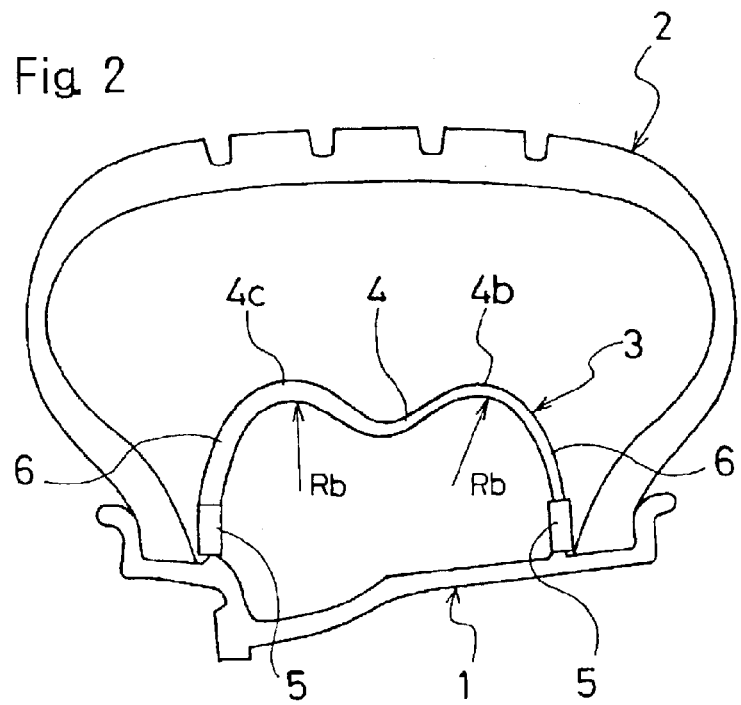
FIG. 2 is a cross-sectional view along a meridian line showing a main part of a tire/wheel assembly according to another embodiment of the present invention.

FIG. 2 shows a tire/wheel assembly according to another embodiment of the present invention.

In the embodiment shown in FIG. 2, the convex portion 4a having the smaller radius of curvature Ra in the embodiment of FIG. 1 is replaced by a convex portion 4c. The convex portion 4c has the radius of curvature Rb that is the same as that of the convex portion 4b on the inner side of the vehicle body, but has an increased thickness. Regarding the convex portion 4c, the thickness of its sidewall (leg portion 6) on the outer side of the vehicle body is also increased as the illustrated example in the drawing. It is also possible to increase the thickness of either the portion 4c or the sidewall thereof (leg portion 6).

As described above, the convex portion 4c formed to have an increased thickness has rigidity higher than that of the convex portion 4b in the inner side of the vehicle body. Thus, the durability of the circular shell 4 is enhanced similarly to the embodiment of FIG. 1. Therefore, a possible distance for run-flat traveling is extended. The thickness of the convex portion 4c is set within a range from 1.1 to 3.0 times as large as the thickness of the convex portion 4b.

Figure 3:
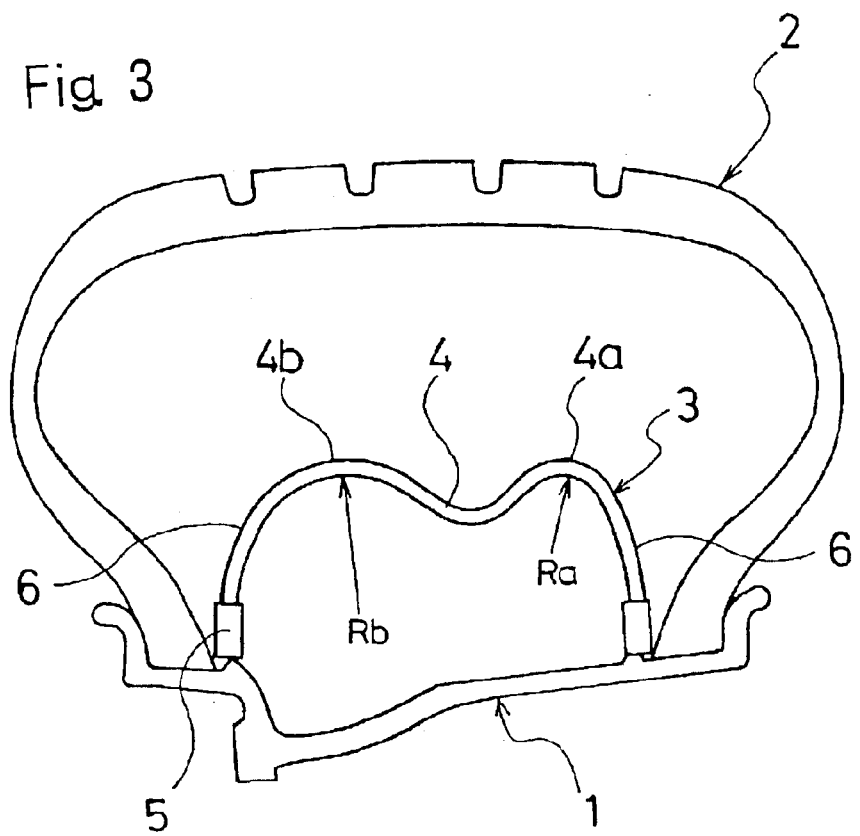
FIG. 3 is a cross-sectional view along a meridian line showing a main part of a tire/wheel assembly according to yet another embodiment of the present invention.

FIG. 3 shows a tire/wheel assembly according to yet another embodiment of the present invention.

In this embodiment, the positions of the convex portions 4a and 4b of the circular shell 4 in a tire width direction in the embodiment of FIG. 1 are swapped with each other. This tire/wheel assembly is advantageous for a vehicle such as a sport utility vehicle, in which the wheel alignment is set to negative camber where the distribution of the load applied to the tire is biased toward the inner side of the tire when fitted to the vehicle.

As heretofore described, according to the present invention, the outer circumferential surface of the circular shell in a cross-section cut in a tire width direction has a shape with a plurality of aligned convex portions, and the convex portions have a plurality of different kinds of radius of curvatures and/or thickness. Consequently, a convex portion that has a smaller radius of curvature or a larger thickness compared to those of the other convex portions has rigidity higher than that of other convex portions. Therefore, by disposing the convex portion having higher rigidity so as to come to the position where the largest load is applied in a tire width direction, durability of the circular shell durability is improved and a run-flat traveling distance can be extended.

EXAMPLE

Prepared was a tire/wheel assembly (wheel) with the configuration of FIG. 1, in which the tire size and rim size are 205/55R16 and 16×6 ½JJ, respectively, and a circular shell of a run-flat support member is formed to have a convex portion 4a with a radius of curvature of 25.0 mm and a convex portion 4b with a radius of curvature of 35.0 mm, using a 1.0 mm-thick steel plate (Example).

For comparison to the foregoing assembly, prepared was a tire/wheel assembly (wheel) having the same configuration as that of the above-described example, except for that both convex portions 4a, 4b have the same radius of curvature of 30.0 mm (Conventional example).

With regard to the above two types of tire/wheel assemblies, possible run-flat traveling distances were measured using the following measurement method, and the results shown in table 1 were obtained.

[Possible Distance for Run-Flat Traveling]

Each of the above tire/wheel assemblies intended for the test having zero tire air pressure was fitted to a front left wheel of a passenger vehicle with a displacement of 2500 cc. Then, a test driver drove the vehicle on a circular track at 90 Km/h, and a traveling distance until the circular shell is broken was measured. The evaluation value was represented by an index number, with the value 100 of run-flat traveling distance measured when the tire/wheel assembly of the conventional example was used. Greater index numbers thereby represent longer possible distances of run-flat traveling.

TABLE 1

|  | Conventional Example | Example |
| --- | --- | --- |
| Radius of Curvature of Convex Portion 4a (mm) | 30.0 | 25.0 |
| Radius of Curvature of Convex Portion 4b (mm) | Same as above | 35.0 |
| Run-Flat Traveling Distance (index number) | 100 | 112 |

What is claimed is:

1. A tire/wheel assembly in which a run-flat support member is inserted in a cavity of a pneumatic tire, the run-flat support member including a circular shell in which an outer circumferential side thereof is used as a support surface and an inner circumferential side thereof is opened to have two leg portions, and elastic rings supporting the ends of the two leg portions on a rim, wherein the outer circumferential surface of the circular shell in a cross-section cut in a tire width direction has a shape with a plurality of convex portions aligned in a tire width direction, and the convex portions have a plurality of different kinds of radii of curvature wherein the convex portion, amongst the plurality of convex portions, disposed on an outer side of a vehicle body when fitted to the vehicle is formed to have a radius of curvature smaller than that of any other convex portion and the convex portion located on the outer side of the vehicle body has a radius of curvature within a range of 0.6 to 0.9 times the radius of curvature of th other convex portion.

2. A tire/wheel assembly in which a run-flat support member is inserted in a cavity of a pneumatic tire, the run-flat support member including a circular shell in which an outer circumferential side thereof is used as a support surface and an inner circumferential side thereof is opened to have two leg portions, and elastic rings supporting the ends of the two leg portions on a rim, wherein the outer circumferential surface of the circular shell in a cross-section cut in a tire width direction has a shave with a plurality of convex portions aligned in a tire width direction, and the convex portions have a plurality of different kinds of thicknesses, wherein the convex portion, amongst the plurality of convex portions, disposed on the outer side of the vehicle body when fitted to the vehicle is formed to have a peak and/or sidewall on the outer side of the vehicle body, the peak and/or sidewall having a thickness larger than that of any other convex portion.

3. The tire/wheel assembly according to claim 2, wherein the convex portion disposed on the outer side of the vehicle body when fitted to the vehicle is formed to have the peak and/or sidewall on the outer side of the vehicle body, the peak and/or sidewall having a thickness of 1.1 to 3.0 times as large as those of the other convex portions.

4. The tire/wheel assembly according to claim 2, wherein the convex portion, amongst the plurality of convex portions, disposed on an outer side of a vehicle body when fitted to the vehicle is formed to have a radius of curvature smaller than that of any other convex portion.

5. A run-flat support member, comprising:

a circular shell in which an outer circumferential side thereof is used as a support surface and an inner circumferential side thereof is opened to have two leg portions; and elastic rings which support ends of the two leg portions on a rim, wherein the outer circumferential surface of the circular shell in a cross-section cut in a tire width direction has a shape with a plurality of convex portions aligned in a tire width direction, and the convex portions have a plurality of different kinds of radii of curvature, wherein the convex portion, amongst the plurality of convex portions, disposed on an outer side of a vehicle body when fitted to the vehicle is formed to have a radius of curvature smaller than that of any other convex portion and the convex portion located on the outer side of the vehicle body has a radius of curvature within a range of 0.6 to 0.9 times the radius of curvature of the other convex portion.

6. A run-flat support member comprising:

a circular shell in which an outer circumferential side thereof is used as a support surface and an inner circumferential side thereof is opened to have two leg portions; and elastic rings which support ends of the two leg portions a rim, wherein the outer circumferential surface of the circular shell in a cross-section cut in a tire width direction has a shape with a plurality of convex portions aligned in a tire width direction, and the convex portions have a plurality of different kinds of thicknesses, wherein the convex portion, amongst the plurality of convex portions, disposed on the outer side of the vehicle body when fitted to the vehicle is formed to have a peak and/or sidewall on the outer side of the vehicle body, the peak and/or sidewall having a thickness larger than that of any other convex portion.

7. The run-flat support member according to claim 6, wherein the convex portion disposed on the outer side of the vehicle body when fitted to the vehicle is formed to have the peak and/or sidewall on the outer side of the vehicle body, the peak and/or sidewall having a thickness of 1.1 to 3.0 times as large as those of the other convex portions.

8. The run-flat support member according to claim 6, wherein the convex portion, amongst the plurality of convex portions, disposed on an outer side of a vehicle body when fitted to the vehicle is formed to have a radius of curvature smaller than that of any other convex portion.

* * * * *